(12) United States Patent
Hurt et al.

(10) Patent No.: US 9,384,591 B2
(45) Date of Patent: Jul. 5, 2016

(54) 3D DESIGN AND MODELING SYSTEM AND METHODS

(75) Inventors: James Hurt, Iowa City, IA (US); Don Luhring, Paonia, CO (US); Vincent Huffaker, Boulder, CO (US); Kurt Andersen, Nashua, NH (US); Ralph Gifford, So. Lancaster, MA (US)

(73) Assignee: Enventive Engineering, Inc., South Lancaster, MA (US)

( * ) Notice: Subject to any disclaimer, the term of this patent is extended or adjusted under 35 U.S.C. 154(b) by 0 days.

(21) Appl. No.: 13/235,309

(22) Filed: Sep. 16, 2011

(65) Prior Publication Data

US 2012/0069011 A1    Mar. 22, 2012

Related U.S. Application Data

(60) Provisional application No. 61/384,161, filed on Sep. 17, 2010.

(51) Int. Cl.
*G06T 19/00* (2011.01)
*G06T 19/20* (2011.01)

(52) U.S. Cl.
CPC ............... *G06T 19/00* (2013.01); *G06T 19/20* (2013.01); *G06T 2219/2021* (2013.01)

(58) Field of Classification Search
USPC .......................................................... 345/419
See application file for complete search history.

(56) References Cited

U.S. PATENT DOCUMENTS

| | | | |
|---|---|---|---|
| 5,617,510 A | 4/1997 | Keyrouz et al. | |
| 5,831,875 A * | 11/1998 | Hirata et al. | ...................... 703/7 |
| 5,867,397 A | 2/1999 | Koza et al. | |
| 6,333,749 B1 | 12/2001 | Reinhardt et al. | |
| 6,377,263 B1 | 4/2002 | Falacara et al. | |
| 6,433,776 B1 | 8/2002 | Todd | |
| 6,889,113 B2 | 5/2005 | Tasker et al. | |
| 6,947,037 B1 | 9/2005 | Lynn et al. | |
| 6,963,824 B1 * | 11/2005 | Davidson et al. | ................. 703/2 |
| 7,233,341 B1 | 6/2007 | Sauerbrei | |
| 7,623,139 B1 | 11/2009 | Gifford et al. | |
| 7,639,267 B1 * | 12/2009 | Desimone et al. | ............ 345/619 |
| 7,969,435 B1 * | 6/2011 | DeSimone et al. | ........... 345/420 |
| 2003/0149498 A1 | 8/2003 | Rebello et al. | |
| 2003/0149502 A1 | 8/2003 | Rebello et al. | |
| 2003/0182311 A1 | 9/2003 | Nakajima et al. | |
| 2003/0187879 A1 | 10/2003 | Tamaru et al. | |
| 2004/0090439 A1 | 5/2004 | Dillner | |
| 2005/0071042 A1 | 3/2005 | Subrahmanyam et al. | |
| 2010/0298967 A1 * | 11/2010 | Frisken et al. | ................. 700/173 |

OTHER PUBLICATIONS

Owen, John C. "Algebraic solution for geometry from dimensional constraints." Proceedings of the first ACM symposium on Solid modeling foundations and CAD/CAM applications. ACM, 1991.*

Robison, Richard Hooper. A practical method for three-dimensional tolerance analysis using a solid modeler. Diss. Brigham Young University. Department of Mechanical Engineering., 1989.*

"Focus on Electrical/Mechanical and Computer/Software-related Claims." Examination Guidance and Training Materials. USPTO, Jul. 2015. Web. Aug. 20, 2015. <http://www.uspto.goy/sites/default/files/documents/uspto_112a_part1_17aug2015.pptx>.*

Alvarado, "A Natural Sketching Environment: Bringing the Computer into Early Stages of Mechanical Design", MIT, May 2000, pp. 1-104.

\* cited by examiner

*Primary Examiner* — Mark Zimmerman
*Assistant Examiner* — Vu Nguyen
(74) *Attorney, Agent, or Firm* — Hamilton, Brook, Smith & Reynolds, P.C.

(57) ABSTRACT

A computer-aided design (CAD) system provides for designing, modeling and simulating objects in 3D. Both 2D and 3D objects can be provided in a 3D space and associated to one another by one or more constraints. Modification to the objects is calculated to satisfy the constraints as well as the geometric and functional properties of the objects. The objects can then be updated according to the calculated modification, thereby satisfying various requirements of the design.

15 Claims, 17 Drawing Sheets

3D DESIGN AND MODELING SYSTEM AND METHODS

RELATED APPLICATION(S)

This application claims the benefit of U.S. Provisional Application No. 61/384,161, filed on Sep. 17, 2010. The entire teachings of the above application is incorporated herein by reference.

BACKGROUND

As a general matter, CAD systems require a constraint server for geometric modeling purposes. Most conventional CAD CS's are parametric with some limited variational capabilities. Several geometric problems are not easily solved with parametric methods, so designers and users of conventional constraint servers attempt to adapt them to solve these modeling problems on a special-case basis.

The special cases employ methods that are somewhat variational, but not in a broad sense of the term. Instead, the adapted functionality is somewhat analogous to the goal seeking capability of a spreadsheet. A spreadsheet is basically parametric, but with a limited ability to solve systems of equations through the use of goal seeking methods.

As a general matter, CAD systems use a parametric, feature-based representation of the solid model. Features are parametric shapes defined by intrinsic geometric parameters, position, and orientation. The user designs a part by incrementally adding features to a solid body. Some CAD systems currently also employ a direct-modeling interface, which allows users to directly move surfaces without any information about part features.

SUMMARY

Embodiments of the invention include a computer-implemented method in a computer aided design system. In one embodiment, a 2D object is provided within a 3D space, the 2D object having a set of geometric and functional properties. A 3D object is also provided within the 3D space, the 3D object having a set of geometric and functional properties. One or more constraints are applied to both the 2D object and the 3D object. Modification to at least one of the 2D and 3D objects is then calculated to satisfy criteria regarding 1) the set of geometric and functional properties of the 2D object, 2) the set of geometric and functional properties of the 3D object and 3) the at least one constraint. Based on this calculated modification, at least one of the 2D and 3D objects is updated.

In further embodiments, the constraint can include a constraint relating an element of the 2D object and an element of the 3D object by a fixed value. The constraint may further include an equation relating a property of the 2D object and a property of the 3D object. The 2D object may further include a force, the force being applied to the 3D object via the at least one constraint.

In still further embodiments, the modification is calculated in part by variationally solving a system of interdependent equations including values corresponding to 1) the set of geometric and functional properties of the 2D object, 2) the set of geometric and functional properties of the 3D object and 3) the one or more constraints. A user-entered constraint (e.g., an equation) may also be included as a factor in the calculated modification.

In yet further embodiments, the set of geometric and functional properties of the 3D object include at least one property having a tolerance (i.e., allowable variation within tolerance limits). To accomplish tolerance and other analysis, embodiments may identify contributors to parameters computed by the 2D-3D model, and compute partial derivatives of the computed parameters with respect to those contributors. A range of possible values of the computed parameter may be calculated based on the range of possible values for the contributors to the computed parameter. The constraints may include a tolerance.

In still further embodiments the 3D object may be a product of the 2D object, the 3D object being created by sweeping (e.g., extruding, rotating) the 2D object into the 3D space.

In yet further embodiments of the invention, a 2D plane is provided within a 3D space. A 3D object is also provided within the 3D space, the 3D object having a set of geometric and functional properties. One or more variational constraints are applied between the 2D plane and the 3D object. Modification to the 3D object is then calculated to satisfy criteria regarding 1) the set of geometric and functional properties of the 3D object, and 2) the at least one variational constraint. Based on this calculated modification, the 3D object is updated.

In still further embodiments of the invention, a first 2D object within a first 2D plane is provided within a 3D space, the first 2D object having a set of geometric and functional properties. A second 2D object within a second 2D plane is also provided within the 3D space, the second 2D object having a set of geometric and functional properties. One or more variational constraints are applied between the first and second 2D objects. Modification to the 2D objects is then calculated to satisfy criteria regarding 1) the set of geometric and functional properties of the first 2D object, 2) the set of geometric and functional properties of the second 2D object and 3) the one or more constraints. Based on this calculated modification, one or both of the 2D objects is updated. In further embodiments, one or both of the first and second planes may also be updated based on the calculated modification.

In yet further embodiments of the invention, a first 3D model is provided within a 3D space, the first model including a 2D object within a 2D plane and at least one object external to the 2D plane, the first model having a set of geometric and functional properties. A second 3D model is also provided within the 3D space, the second model including a 2D object within a 2D plane and at least one object external to the 2D plane, the second model having a set of geometric and functional properties. One or more constraints are applied between the first and second 2D objects. Modification to the 2D objects is then calculated to satisfy criteria regarding 1) the set of geometric and functional properties of the first model, 2) the set of geometric and functional properties of the second model and 3) the one or more constraints. Based on this calculated modification, at least one of the 3D models is updated.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Figure 1:
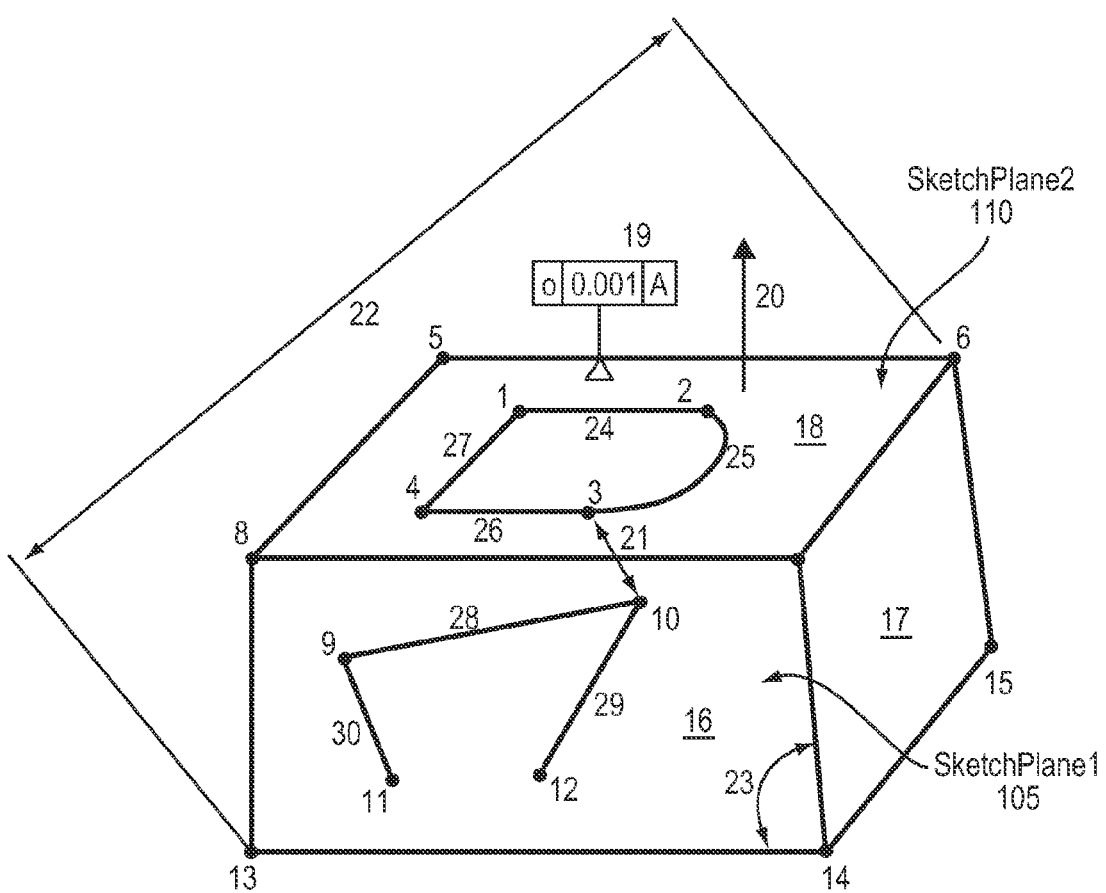
FIG. 1 illustrates an assembly having two objects in an embodiment of the invention.

A description of example embodiments of the invention follows.

Embodiments of the present invention relate to computer-aided design (CAD) and associated methods and systems for designing, modeling and simulating objects in 3D. More particularly, embodiments relate to the technical fields of 3D Variational Design and 3D Conceptual Design, 3D Force Analysis, and 3D Tolerance and Variation Analysis.

GLOSSARY OF TERMS

Constraint Server (CS)—A CS is computer software code used to solve and maintain mathematical and/or geometric relationships (e.g., y constrained equal to 2 times x, lines constrained to be parallel or perpendicular, a line constrained tangent to a circle).

PAGE—The Geometry Engine (GE) used in prior art systems such as Pro/Engineer, commercially available from Parametric Technology, Inc., of Needham, Mass.

ECS—A CS in accordance with the present invention.

Parametric—Refers to a method of solving mathematical and/or geometric relationships that essentially requires that the relationships be sequential (directed), and processes them accordingly. For example, if y=2x, and x=3z, a parametric system would need to begin with the value of z to solve x, and then solve for y based on the value of x. A spreadsheet is fundamentally parametric, requiring a certain sequence in the order in which cells are solved.

Variational—Refers to a method of solving non-directed relationships. For example, a variational system could solve for x in the relationship $2x+5=3x^2-2$. In this case, x on the left side of the equation depends on x on right side of the equation, and vice versa. Or if the equation were written as $2x+b=ax^2-c$, and sufficient other relationships were defined in terms of a, b, c, and x, thereby creating a system of interdependent equations, a variational system would be able to solve the system of equations (assuming a solution exists). The ECS is variational.

Stick Figure Modeling—Refers to a method of simplified modeling in which simple geometric elements are used to represent more complex objects, especially for purposes of creating models to simulate functional performance. For example, a spring might be represented by a line, or a hydraulic cylinder might be represented by a line. When used to simulate a spring, a change in line length could represent a change in spring length, which would correspond to a change in the force applied by the spring. When used to represent a hydraulic cylinder, a change of length might represent a change in pressure or flow. In stick figure modeling points are often used to represent kinematic joints, circles to represent shafts or holes, and so on.

Stick figure modeling is often referred to informally as "back of the envelope" sketching, conveying the sense that it's a method for rapidly creating a symbolic representation of the key functional elements of a product.

2D stick figure modeling includes points, lines, arcs, circles, forces, moments, user-entered equations, and appropriate constraints between the elements that permit users to create simplified models for the purpose of simulating and analyzing critical functional aspects of product performance, including kinematic simulation, force calculations, tolerance variations, and other physics-based phenomena.

In embodiments of the present invention, the definition of stick figure modeling is expanded to include 3D elements that could not be represented on the "back of an envelope" or in a 2D system for stick figure modeling. These additional elements include (but are not limited to) 3D points, 3D lines, planar surfaces that may constrained or oriented spatially, cylindrical surfaces, and spherical surfaces. The surfaces may stand alone and need not be part of a solid model. In other words, the surfaces follow the spirit of a stick figure model which is to use a simplified element for functional modeling. In addition, in the present invention the 3D elements may be constrained to 2D elements in such a way that it allows 2D stick figure models to drive 3D elements, or vice versa, or to act in such a way that the 2D and 3D elements are an integral system driving each other.

Practical applications of this invention include many mechanisms that incorporate multi-planar motion in which elements in one plane of motion are connected to elements in the other plane of motion via a 3D element such as a connecting rod. Embodiments of the present invention permit stick figure representation of each planar motion using 2D elements, with the innovation of spatially orienting the planes, and connecting appropriate elements in each plane with a 3D line representing a connecting rod, and with the end points of the line representing a connecting joint.

It would be useful to provide a system utilizing true variational methods to enable enhanced handling and solving of geometric and other problems in CAD and other design and modeling systems.

It would also be useful to provide a system that allows design of 3D geometry in a manner that is conducive to engineering design analysis and optimization, including but not limited to 3D Force Analysis and 3D Tolerance Analysis.

A constraint server (ECS) as implemented in embodiments of the present invention differs from conventional CAD Geometry Engines because the ECS handles general mathematical relationships (constraints) combined with geometric constraints. In one practice of the prior art, the ECS converts geometric constraints into mathematical constraints so that all constraints can be handled mathematically.

Embodiments of the present invention provide a number of capabilities and advantages, including:

I. Users may work with variational geometry on different variational sketch planes in 3D.

II. Geometric Dimensioning and Tolerancing of surfaces may be handled as variational constraints.

III. Incorporating variational Physics Constraints including 3D Forces, Moments, Velocities, and Accelerations, combined with variational geometric constraints.

IV. Variational 3D Stick Figure Modeling suitable for 3D kinematics and other physics modeling without requiring complete 3D models.

V. The combined effect of the preceding capabilities is a new approach to 3D modeling having greater efficiency and problem-solving functionality.

I. Working with Geometry on Different Variational Sketch Planes in 3D

Typical prior art systems allow the user to create 3D models by parametrically defining a solid 3d model, incrementally adding 3d features to the solid model until the model looks correct. While this approach can produce realistic looking solid models, it is not conducive to design analysis and optimization.

Embodiments of the present invention include a method for 3D design that combines variational 3D geometry with 2D variational geometry in 2D sketch planes that lie on 3D planar surfaces, combined with the ability to constrain across these sketch planes to drive the 2D variational geometry on sketch planes as well as the position and orientation of those sketch planes, and/or drive the 3D variational geometry.

Referring now to an embodiment in more detail, FIG. 1 is a view of a box with two sketch planes, SketchPlane 1 105 and SketchPlane 2 110, on the front and top surfaces. Within each plane 105, 110 is a respective 2D object comprising a number of points connected by straight lines and curves. Further, a constraint, represented by dimension 21, is applied between the two objects. The variational geometry on SketchPlane 1 105 involves Point 10, and the variational geometry on SketchPlane2 110 involves Point 3. Dimension 21 is a 3D dimension between Point 10 and Point 3, and can operate as a constraint between Point 10 and Point 3.

In a typical design system, Dimension 21 could be created, but it would be restricted to being a "measurement"—it must be an output of the system and cannot be used to drive the geometry or the Sketch Planes. In contrast, in the embodiment shown in FIG. 1, Dimension 1 can drive not only the geometry in SketchPlane1 105 and SketchPlane2 110, but also the position and orientation of SketchPlane1 105 and SketchPlane2 110. Table 1 provides a listing of the geometric elements shown in FIG. 1. Table 2 provides a listing of constraints applied to the elements in FIG. 1.

TABLE 1

Geometric Elements in FIG. 1

| Number | Name | Description |
| --- | --- | --- |
| 1 | Point1 | A 2D point on SketchPlane2 |
| 2 | Point2 | Another 2D point on SketchPlane2 |
| 3 | Point3 | A third 2D point on SketchPlane2 |
| 4 | Point4 | A fourth 2D point on SketchPlane2 |
| 5 | Point5 | A 3D point at one corner of SketchPlane2 |
| 6 | Point6 | A 3D point at another corner of SketchPlane2, also at a corner of Plane3 |
| 7 | Point7 | A 3D point at a third corner of SketchPlane2, also at a corner of SketchPlane1, also at a corner of Plane3 |
| 8 | Point8 | A 3D point at a fourth corner of SketchPlane2, also at a corner of SketchPlane1 |
| 9 | Point9 | A 2D point on SketchPlane1 |
| 10 | Point10 | Another 2D point on SketchPlane1 |
| 11 | Point11 | A third 2D point on SketchPlane1 |
| 12 | Point12 | A fourth 2D point on SketchPlane1 |
| 13 | Point13 | A 3D point at one corner of SketchPlane1 |
| 14 | Point14 | A 3D point at another corner of SketchPlane1, also at a corner of Plane3 |
| 15 | Point15 | A 3D point at one corner of Plane3 |
| 16 | SketchPlane1 | A planar surface which contains some 2D variational geometry |
| 17 | Plane3 | A 3D planar surface |
| 18 | SketchPlane2 | Another planar surface which contains other 2D variational geometry |

TABLE 1-continued

Geometric Elements in FIG. 1

| Number | Name | Description |
| --- | --- | --- |
| 19 | GD&T Symbol | A GD&T symbol attached to the plane of SketchPlane2 |
| 20 | Force1 | A 3D force vector acting on SketchPlane2 |
| 21 | Dimension1 | A 3D dimension between Point3 and Point10 |
| 22 | Dimension2 | A 3D dimension between Point6 and Point13 |
| 23 | Dimension3 | An angular dimension between SketchPlane2 and Plane3 |
| 24 | Line1 | A 2D line between Point1 and Point2 |
| 25 | Arc1 | A 2D arc between Point2 and Point3 |
| 26 | Line2 | A 2D line between Point3 and Point4 |
| 27 | Line3 | A 2D line between Point4 and Point1 |
| 28 | Line4 | A 2D line between Point9 and Point10 |
| 29 | Line5 | A 2D line between Point10 and Point12 |
| 30 | Line6 | A 2D line between Point11 and Point9 |

TABLE 2

Constraints applied in FIG. 1

| Name | Description |
| --- | --- |
| Dimension1 | A linear dimension between the 2D Point3 on SketchPlane2 and the 2D Point10 on SketchPlane1 |
| Dimension2 | A 3D linear dimension between the 3D Point13 and the 3D point6. |
| Dimension3 | A 3D angle between planes dimension that controls the angle between Plane3 and SketchPlane2 |
| GD&T Symbol | A GD&T perpendicularity specification between SketchPlane2 and SketchPlane1, which implies a 3D perpendicularity constraint between these two planes. |

Figure 2A:
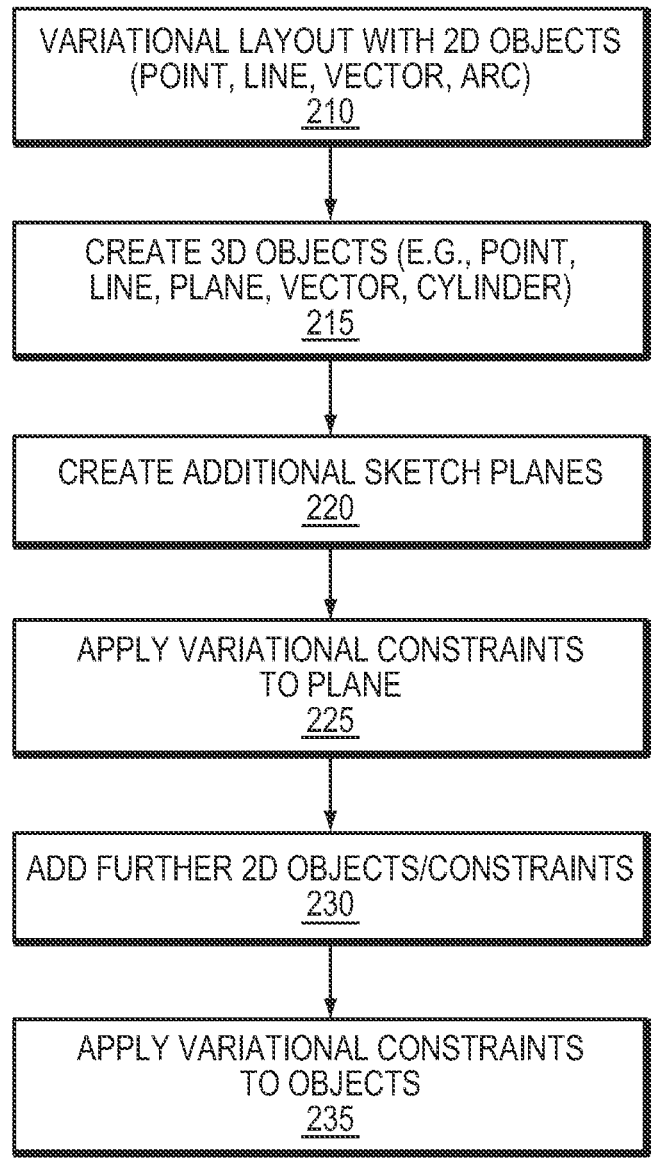
FIG. 2A is a flow diagram of a process of providing and applying constraints to objects in an embodiment of the invention.

FIG. 2A is a flow diagram of a process of providing and applying constraints to objects in an embodiment of the invention. In particular, the process may be employed by a user to combine 2D and 3D objects in a single variational system. Initially, a user may begin with a design layout having one or more 2D objects (210). A user may create variational sketch with 2D objects (e.g., 2D objects comprising points, lines, vectors, arcs, 2D dependent instances from 2D master components) and variational 2D constraints between the 2D objects (e.g., size, location, orientation) as necessary to achieve the modeling objective.

3D objects are then created within the 3D space in which the 2D objects (and their respective planes) reside (215). The user may create 3D objects suitable for use in a variational design system (e.g., 3D objects comprising points, lines, planes, vectors, cylinders, 3D dependent instances from 3D master components), and variational 3D constraints (size, location, orientation) as necessary between the 3D objects.

Additional sketch planes may then be created (220). Example operations for creating sketch planes include:

Extruding a 2D line to create a single new sketch plane in which the extruded line is at the intersection of the new sketch plane and the original plane of the 2D line, and belongs to both sketch planes by virtue of an automatically added variational transform constraint that relates the line's coordinates in the new sketch plane with the coordinates in the initial sketch plane;

Extruding an open 2D profile to simultaneously create multiple sketch planes such that each line in the 2D profile is at the intersection of the new sketch plane created from it, and belongs to the new plane from which it was created by virtue of an automatically added variational transform constraint;

Extruding a bounded 2D region to create a solid with sketch planes possible on each planar surface created by the extrusion, with each line in the original closed region at the intersection of the new sketch plane created from it, and each line belonging to the new plane from which it was created by virtue of an automatically added variational transform constraint;

Manually adding a sketch plane

Next, variational constraints may be applied to the 2D sketch planes (225). This may involve constraining the sketch plane to a 2D point or to a 3D point, and constraining the orientation relative to other sketch planes and/or extruded surfaces.

Additional objects (2D and/or 3D), as well as associated constraints, may then be added (230).

Variational constraints may then be applied to the objects (235). Variational constraints may be applied between 2D and 3D objects (e.g., constraining a 2D point and 3D point coincident, constraining a 3D point to lay on a 2D line, constraining a 2D point to lay on a 3D line, constraining a 3D point to lay on a 2D surface, adding a dimension between a 3D point and a 2D point). The ability to add constraints between 2D and 3D objects is made possible by the automatic application of variational transform constraints that relate the coordinates of the 2D objects to the coordinates of the 3D space. Further, variational constraints may be applied between 2D objects on different sketch planes. Such constraints are 3D constraints and are made possible by the automatic application of variational transform constraints that relate the coordinates of the 2D objects to the coordinates of the 3D space.

The ability to combine 2D Sketch Planes and 3D Planar Surfaces allows the user to create a simplified "stick figure" representation of their 3D model. This simplified representation is far more conducive to design analysis and optimization than a more detailed 3D model, and eliminates the need to redesign and regenerate detailed 3D models throughout an analysis process.

II. Handling of Geometric Dimensioning and Tolerancing of Surfaces as Variational Constraints Typical CAD systems, such as Pro/Engineer, supports the notion of creating Geometric Dimensioning and Tolerancing (GD&T) attributes on surfaces. However, these attributes are only annotations, and do not affect the model itself.

As an example of the prior art, in Pro/Engineer, a user enters commands to create one planar surface (as part of a solid model), then enter commands to construct a second planar surface parallel to the first (as part of the same solid model), and then enter the commands to attach GD&T annotation to the two surfaces indicating how far out of parallel these two planar surfaces are allowed to become. Notice that the GD&T in the prior art system is annotation and not functional. The planar surfaces are parallel because of the commands used to construct them, not because of the GD&T symbols.

Embodiments of the present invention handle GD&T in a manner that departs significantly from that of typical systems. In the present invention, GD&T information is converted to mathematical constraints on the surfaces that are then solved using a constraint server (ECS).

In the process described above with reference to FIG. 2A, using ECS the user would enter the commands to create the two planar surfaces, which may or may not be part of a solid model, then enter the commands to create the GD&T symbols that indicate how far out of parallel these two planar surfaces are allowed to become. When created, the two planar surfaces are not necessarily parallel. But they become parallel when the GD&T symbols are created, thereby updating the geometry in real time in response to user input. Notice that these GD&T symbols are functional in that they cause the two planar surfaces to be parallel.

Embodiments of the present invention may employ a number of different approaches to respond to commands the user uses to create the model including GD&T symbols and display the model to the user. Such approaches may employ the industry standard ASME Y14.26 Digital Representation for Communication of Product Definition Data. The difference is in how the model behaves as the user makes alterations to it and what kinds of analysis the model will support.

Figure 2B:
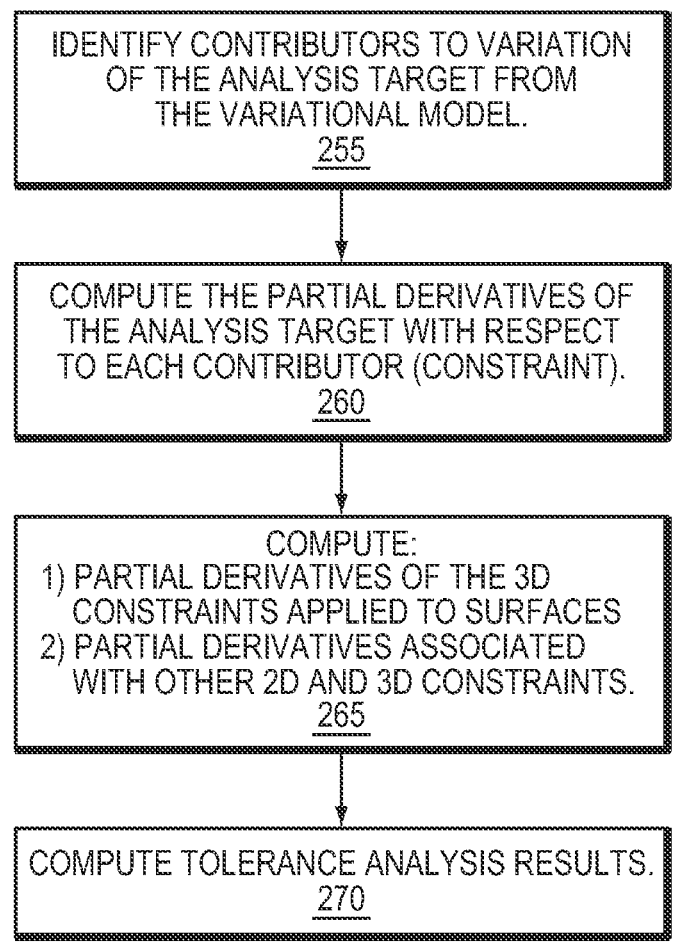
FIG. 2B is a flow diagram of a process of tolerance analysis in an embodiment of the invention.

FIG. 2B is a flow chart illustrating tolerance and variation analysis of a 3D model, including 3D GD&T representation of surfaces and 3D physics constraints. When solving the GD&T constraints for the nominal geometry, the ECS may ignore the numerous tolerance zone specifications and treats all these specifications as if they were zero. After solving for the nominal geometry, when the system proceeds to perform tolerance stack up analysis with the ECS, all possible solutions for the geometry which satisfy the actual tolerance zone specifications are considered. This type of analysis is not possible with previous art where the GD&T symbols are annotation.

To initialize tolerance analysis in a 3D design, elements are identified that contribute to variation of the analysis target from the variational model (255). The contributing elements may be identified by a dependency graph produced by a constraint server (ECS). The dependency graph serves to optimize the solving performance, assess whether the model is under, fully, or over constrained, and identify contributors to parameters computed by the 2D-3D model. One skilled in the art will recognize that the constraints of the model correlate with the contributors. Next, the partial derivatives of the analysis target are calculated with respect to each contributor (i.e., constraint) (260). Because the ECS uses a modified Newton Raphson method for solving the system of equations that represent the elements and constraints of the 2D-3D model, one skilled in the art will recognize that partial derivatives must be computed in order to use the Newton Raphson method. The ECS uses this capability to compute the partial derivatives of each tolerance analysis contributor. The partial derivatives of the 3D constraints applied to surfaces, as well as the partial derivatives associated with other 2D and 3D constraints, are then calculated (265). When the constraints apply to surfaces, ASME Y14.5 or other appropriate standards (e.g., ISO, JIS, DIN) that define Geometric Dimensioning and Tolerancing practices may be taken into account. This requires an appropriate surface boundary be chosen to properly compute the partial derivatives. Given the above results, the tolerance analysis may be completed, and the results are computed to indicate related to each object or element being analyzed (270). An example embodiment demonstrating tolerance analysis is described below with reference to FIGS. 4A-F.

III. Incorporating Variational Physics Constraints such as 3D Forces, Moments, Velocities, and Accelerations, Combined with Variational Geometric Constraints In embodiments of the present invention, physics constraints such as 3D forces and moments and velocity and acceleration vectors are represented as constraints that are solved by the ECS. Because these constraints are solved simultaneously with the other constraints (e.g., constraints applied to 2D and 3D geometry, planes, and surfaces), and because the present invention computes the effects of variation (Geometric Dimensioning and Tolerancing as well as variation of non-geometric variables (e.g., material properties, temperature, voltage) the physics constraints may determine geometric solutions, and/or geometric constraints may determine the physics solutions, and include the effects of variation in the design optimization process.

For example, some embodiments might be employed to model and optimize a suspension system. The engineer would use the present invention to create a 3D model of the critical geometric elements and add objects and physics constraints representing the springs and dampers of the suspension system. The engineer would then simulate the performance of the suspension system under varying operating conditions, and include the effects of manufacturing variation (e.g., Geometric Dimensioning and Tolerancing), and further include variations in material properties of the springs and dampers. The present invention would enable the engineer to optimize the entire system, including the critical geometric values and spring and damper values, and tolerances required to deliver reliable performance of the suspension system.

Prior art systems such as ADAMS and Working Model do not combine variational geometric and physics constraints and the effects of geometric or non-geometric variation, and are unable to use variational methods to optimize product designs, including optimization of elements with variational constraints internal to a rigid body, based on the combination of these factors.

IV. Variational 3D Stick Figure Modeling

A critical aspect of embodiments of the present invention is the flexibility and simplicity that enables engineers to create 3D stick figure models for the purpose of modeling the physical behavior (the physics) and critical geometric features, relieving them of the requirement to create complete solid models. For example, the stick figure models permit the creation of a variational planar or a cylindrical surface without creating a complete solid model, and then applying variational forces or other constraints representing physics to those surfaces, or to variational 2D stick figure objects on those variational 3D surfaces.

Embodiments of the present invention extends the prior art of 2D stick figure variational systems by adding variational 3D objects that can be used in 3D stick figure models, and combining variational 2D and 3D objects and constraints in 3D stick figure models.

For example, 3D line endpoints may be constrained coincident with 2D line endpoints. The 2D line may be constrained to a variational planar surface, which may be constrained via a 3D orientation constraint to another planar surface, or to the axis of a 3D cylindrical surface. In other words, 2D and 3D constraints work together as a system of constraints permitting users to flexibly combine 2D and 3D modeling to produce sophisticated variational 3D models without creating solid models.

To further illustrate an embodiment of the present invention, a 2D line on one plane may be extruded to create a new planar surface on which further 2D geometry may be sketched and constrained. 3D constraints may be applied to the new plane or to objects on the new plane. The orientation of the new plane may subsequently be driven by the 3D constraints applied to 2D objects on the plane and/or 2D objects on the plane may be driven by the 3D constraints.

The notion of extruding or revolving a region to create a solid model is well established in prior art systems. The present invention permits the extrusion or revolution of individual 2D elements to create variational surfaces without creating solid models. For example, a line may be extruded to create a planar surface, a circle may be extruded to create a cylindrical surface, or an arc could be extruded to create a partial cylindrical surface.

These variational surfaces may be constrained with 3D variational constraints. For example, a 3D cylindrical surface could be constrained tangent to a planar surface, or the orientation of one planar surface could be constrained with respect to another planar surface.

The ability to create simple variational surfaces without creating solid models greatly extends the ability to create stick figure models for engineering simulation and analysis.

V. Advantages of Combining Physics Constraints and Functional GD&T Constraints in a Simplified 3D Model Representation Embodiments of the present invention can provide several advantages over typical design systems, including allowing preliminary design engineers to create rough 3D stick figure models of their concept including functional Geometric Dimensioning and Tolerancing constraints, and physics constraints with little more effort than sketching on a paper napkin or on the back of an envelope. Furthermore this model provides preliminary design engineers the method for analysis and optimization of the design concept, including the analysis of Geometric Dimensioning and Tolerancing, and tolerance stack-up analysis.

Figure 3A:
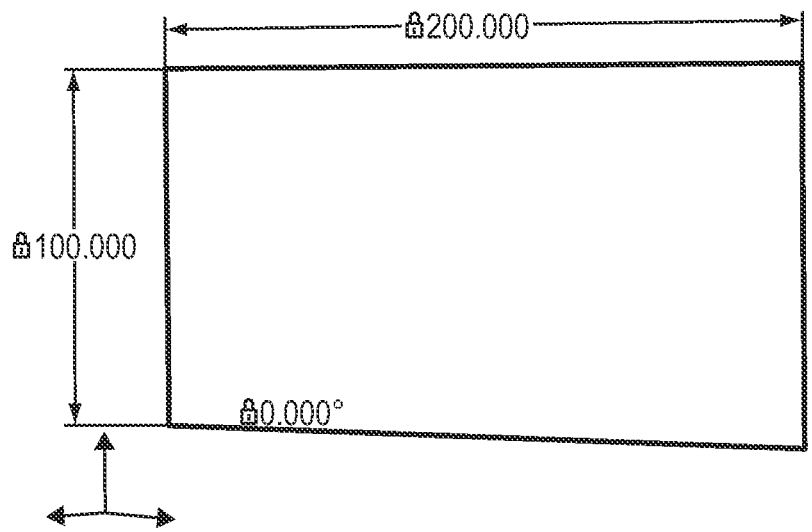
FIGS. 3A-O illustrate an assembly as it undergoes a number of operations in an embodiment of the invention.
Figure 3B:
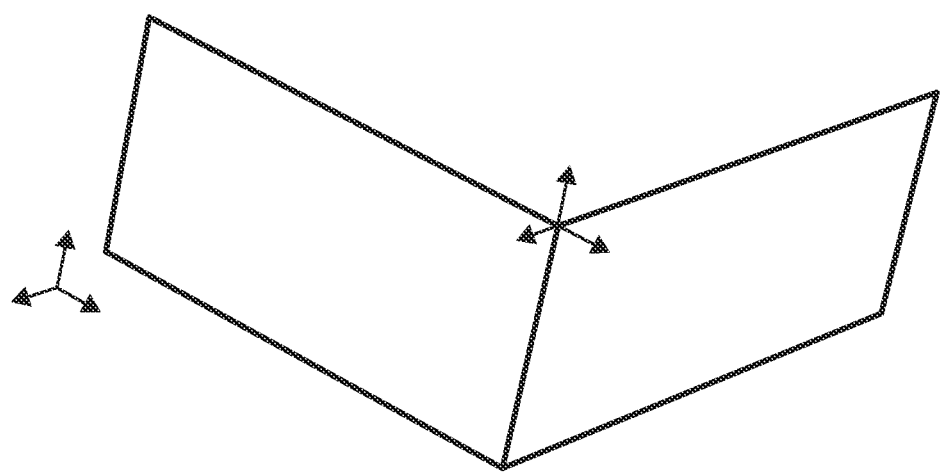
Figure 3C:
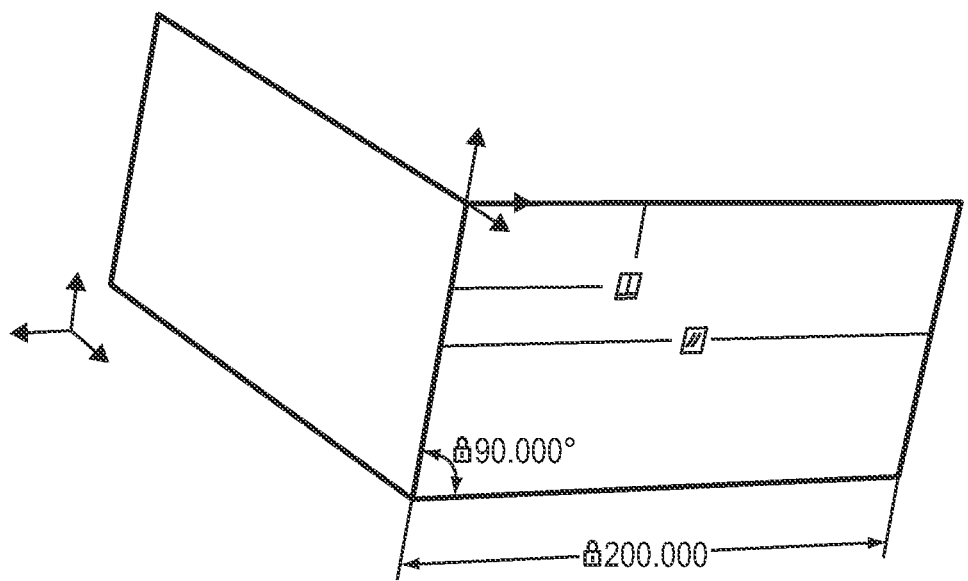
Figure 3D:
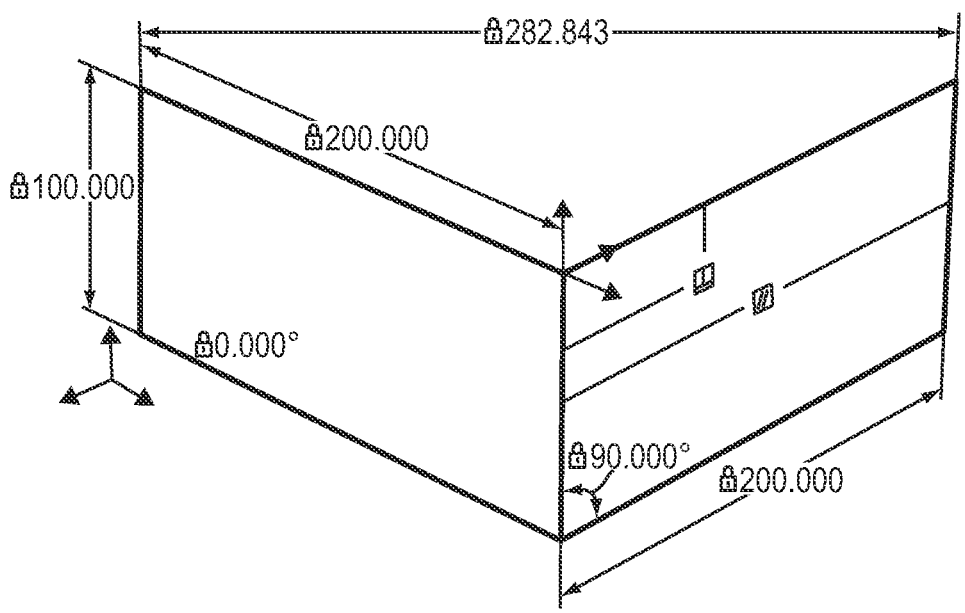
Figure 3E:
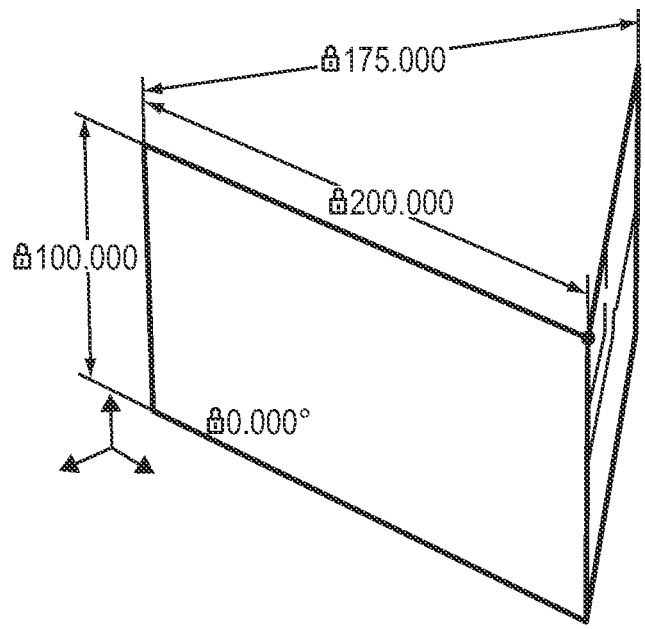
Figure 3F:
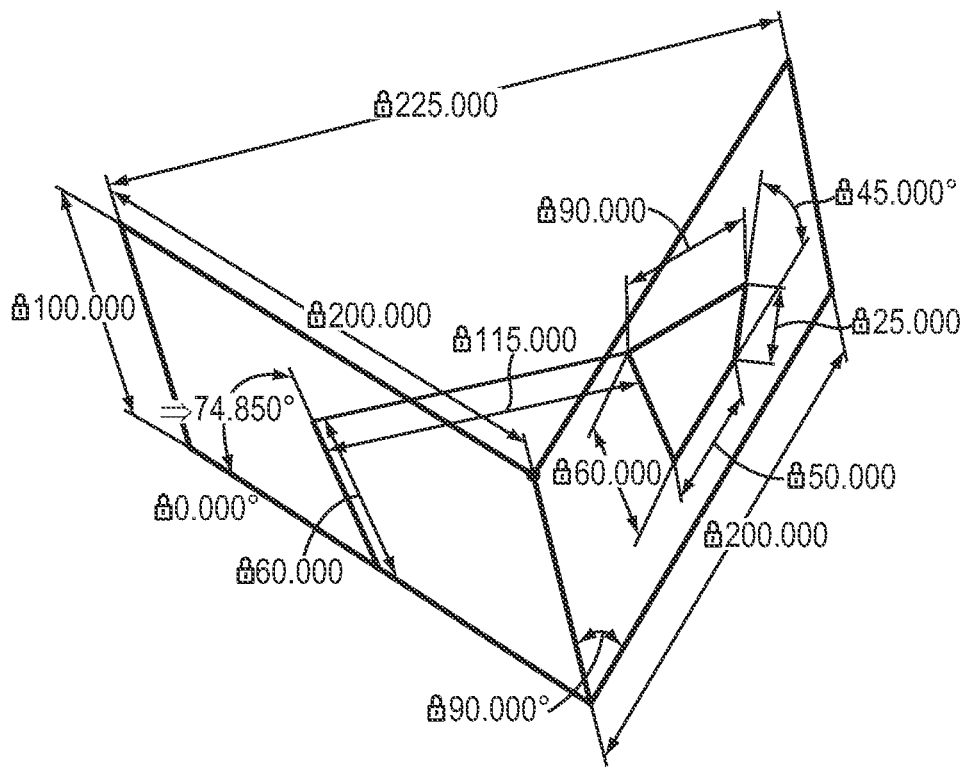
Figure 3G:
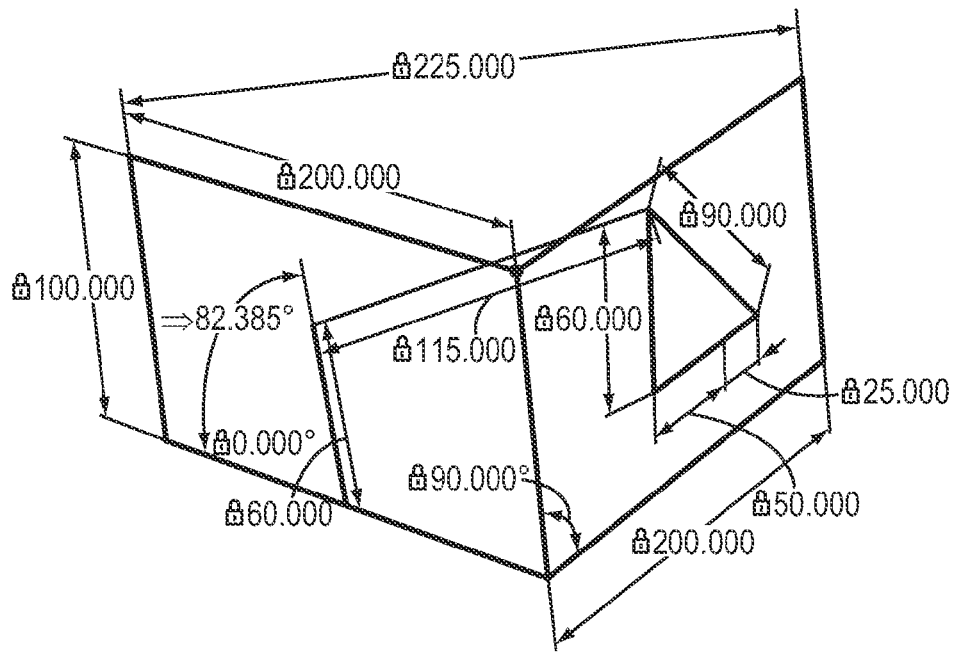
Figure 3H:
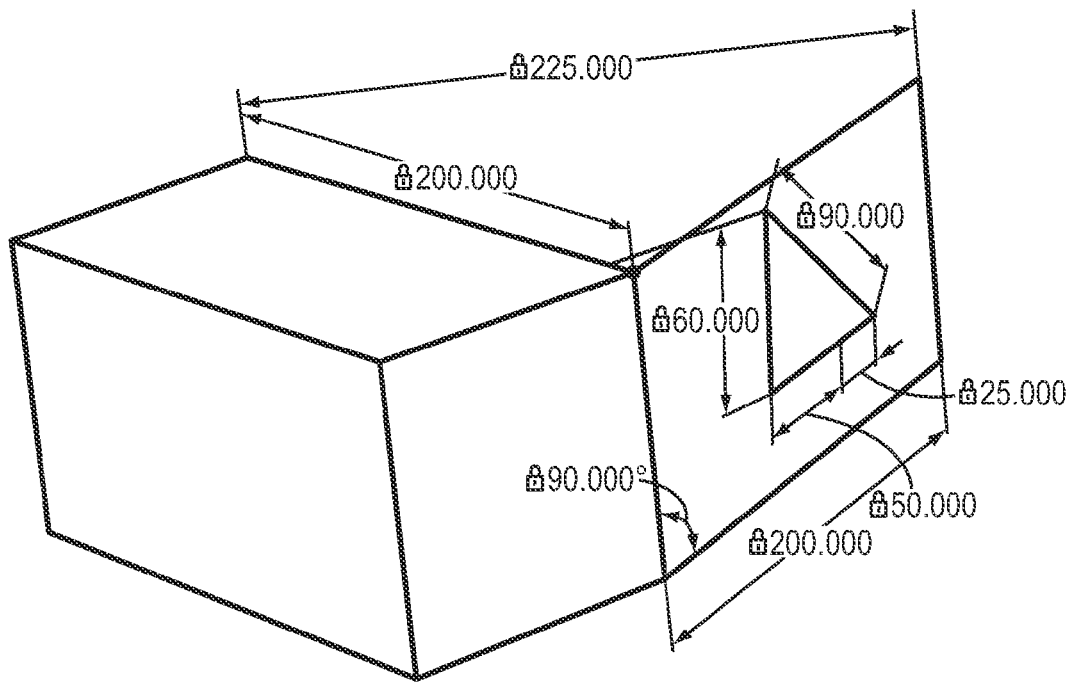
Figure 3I:
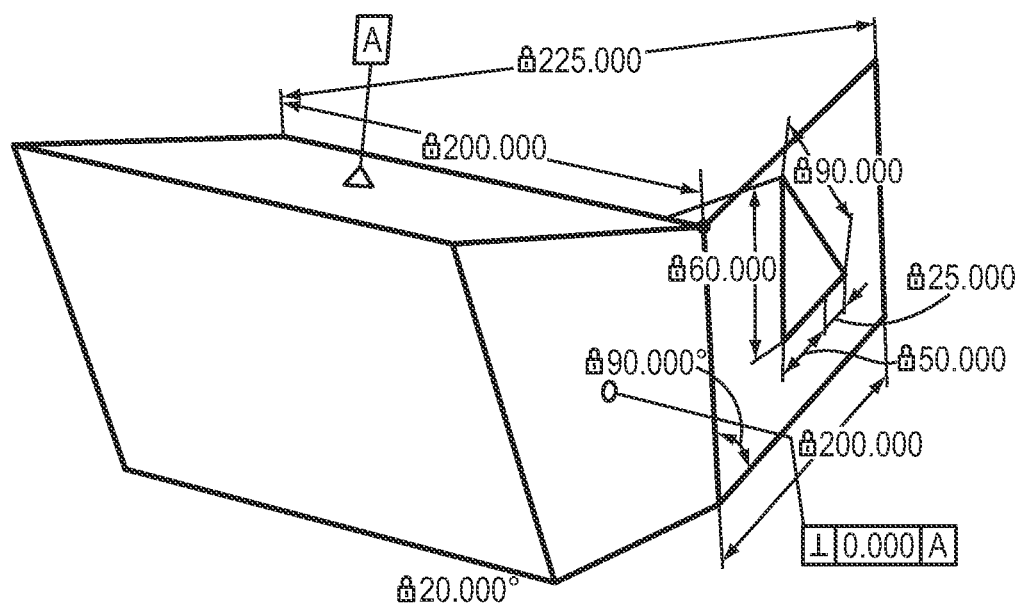
Figure 3J:
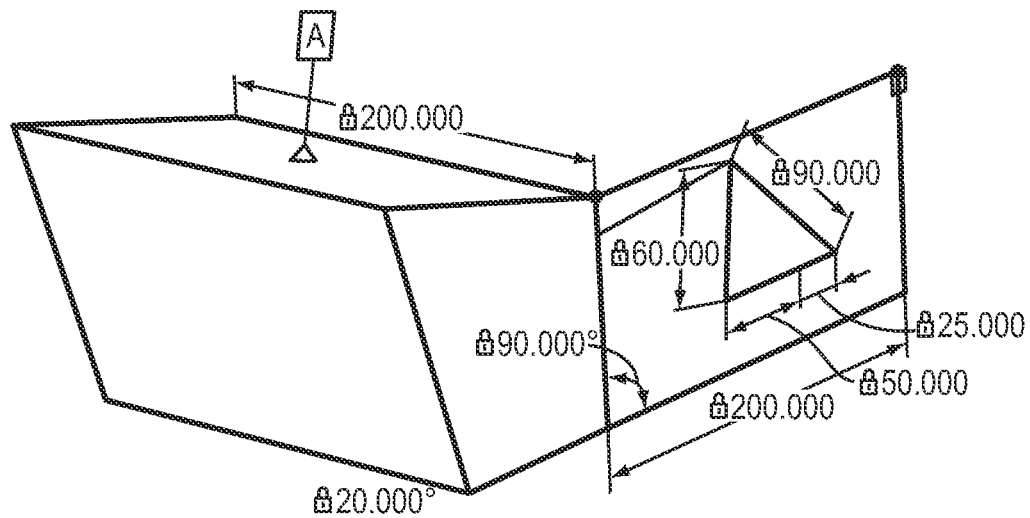
Figure 3K:
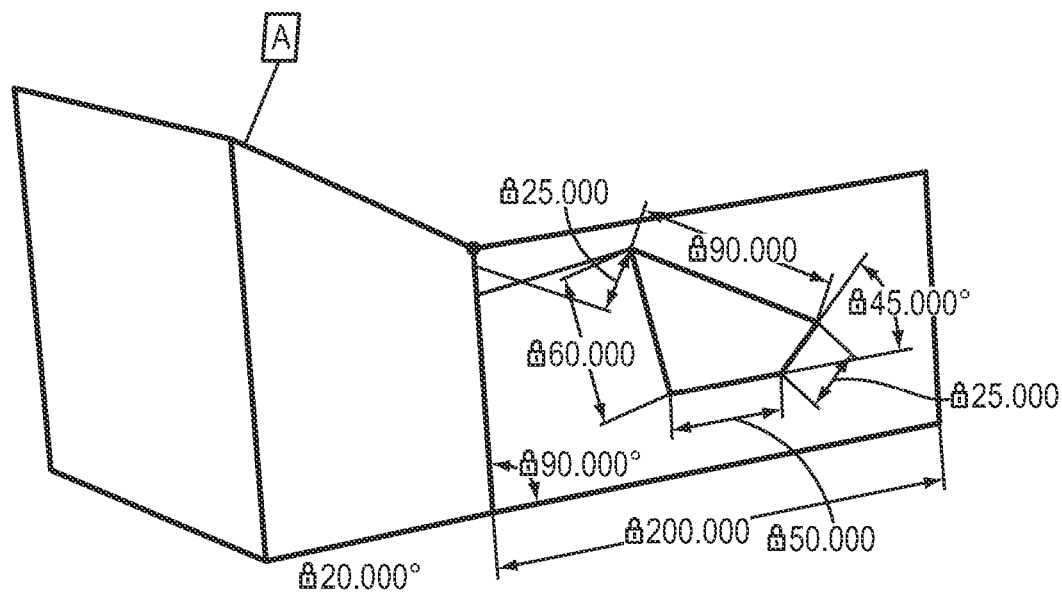
Figure 3L:
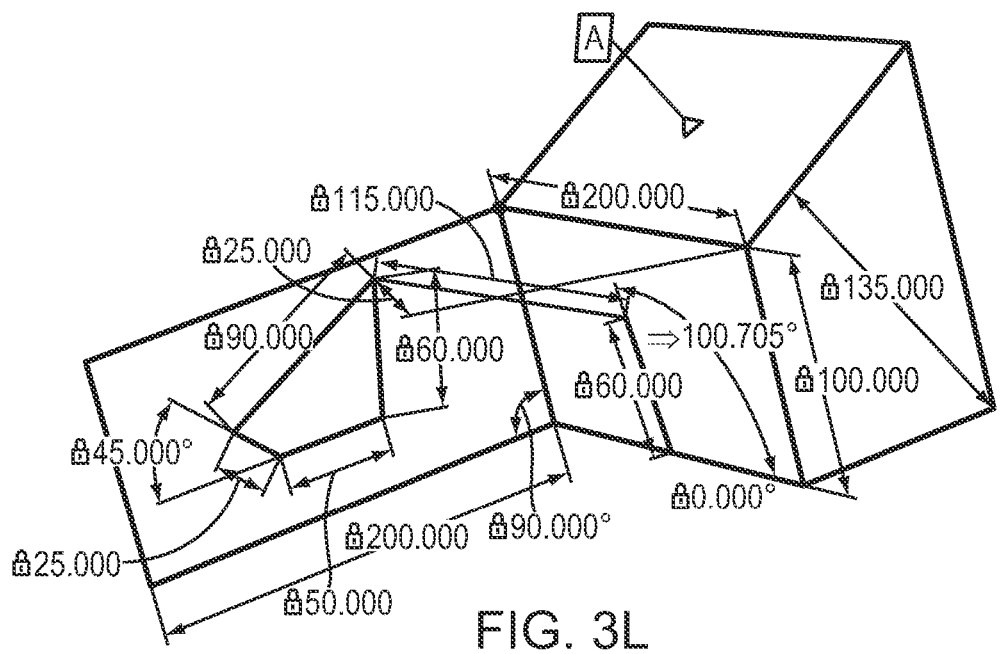
Figure 3M:
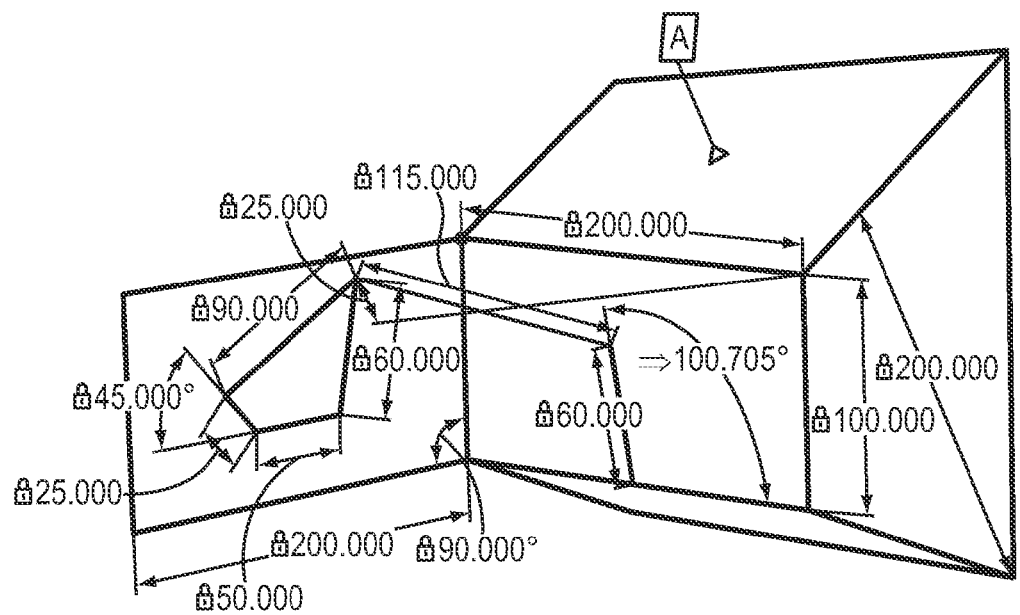
Figure 3N:
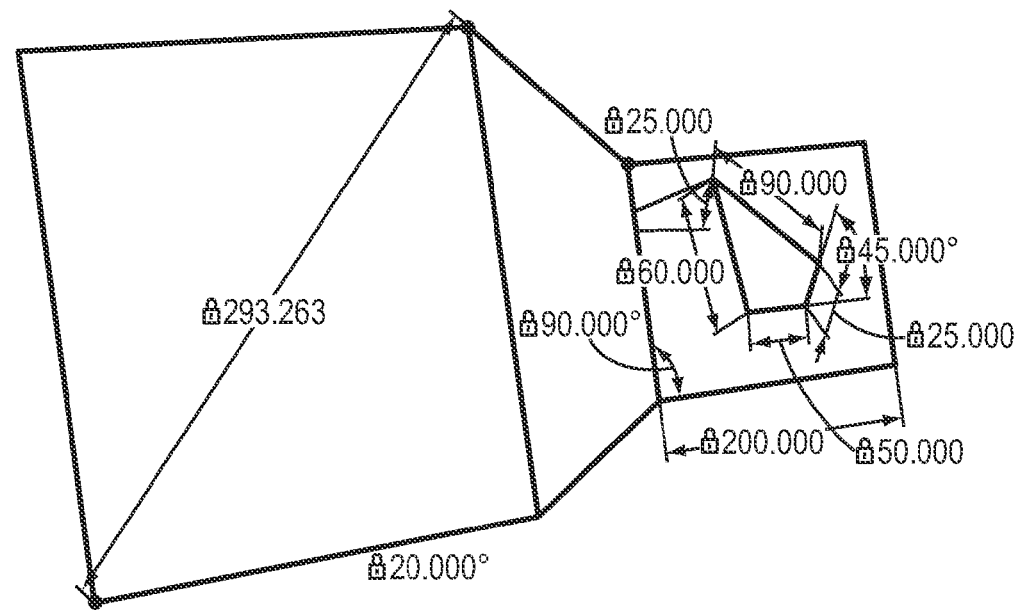
Figure 3O:
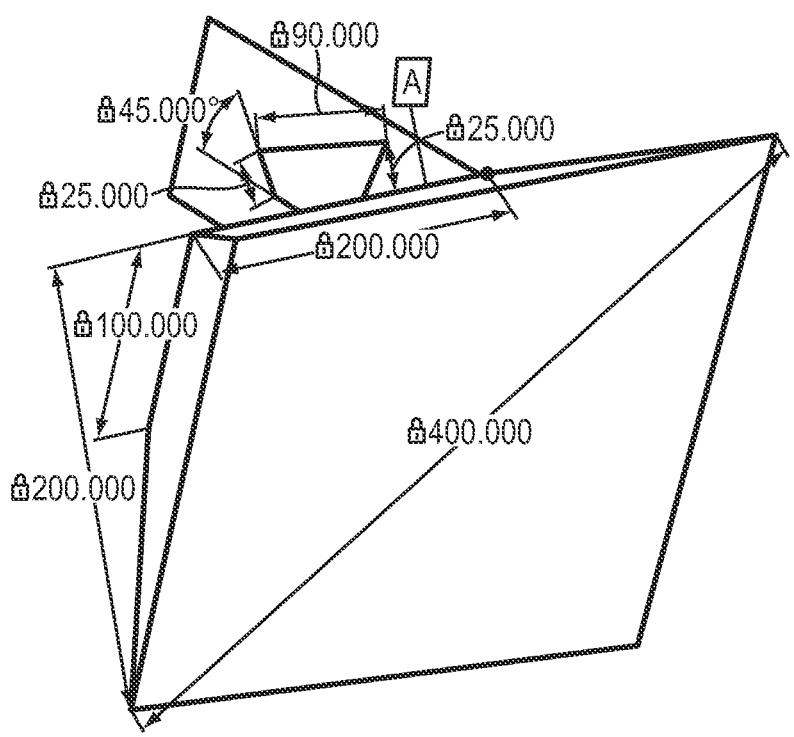

FIGS. 3A-O illustrate an assembly including a number of elements as it undergoes several operations in an embodiment of the invention. Each of the drawings in FIGS. 3A-O depict a successive step of a process, and a description of the operations completed at each step is provided below.

FIG. 3A: A simple 2D sketch on a single 2D plane is depicted.

FIG. 3B: Extrude a vertical line on right end to create second plane. (The dimensions from first plane are hidden while 2nd plane is "active".)

FIG. 3C: Dimensions and constraints are added to the 2D geometry on new plane. The dimension values may be edited to drive values (e.g., line length and angle)

FIG. 3D: A 3D point-to-point dimension is added between 2D points on two different planes FIG. 3E: The value of the 3D dimension is changed to 175, causing the orientation of the 2nd plane to change.

FIG. 3F: Simple stick figure mechanisms are added on each plane using 2D stick figure geometry, and connected by a 3D line so that, as the mechanism moves on one plane, it drives the mechanism on the other plane through the 3D line.

FIG. 3G: As the angle of the 4-bar mechanism on the plane on the right side is changed from 45 degrees to 0.0 degrees, the "wiper" mechanism on the left plane changes from 74.859 degrees to 82.385 degrees.

FIG. 3H: 2D regions are extruded to create variational surfaces.

FIG. 3I: Constraints are added to the variational surfaces. In one case an angle dimension has been added between two surfaces, and a perpendicularity constraint specified as a GD&T perpendicularity callout has been added to a different set of surfaces.

FIG. 3J: The 3D dimension that previously constrained the angle between the first two planes is deleted, and a 2D point on the 2nd plane is constrained to be "point-on-surface" to a variational surface created via the extrusion operation. This causes the plane to be aligned with the variational surface.

FIG. 3K: A 2D-point-to-3D-surface dimension is added between a 2D point on the 4 bar mechanism and the top surface of the extrusion and set to 25.000. As the mechanism moves it causes the surface to move in response.

FIG. 3L: A dimension is added between the top surface of the extrusion and a 3D point on the extrusion as shown.

FIG. 3M: As the dimension added above is changed, the model responds accordingly.

FIG. 3N: A dimension is added between two 3D points on the extrusion.

FIG. 3O: As the value is changed the model updates accordingly.

FIGS. 4A-F illustrate an assembly as it undergoes the application of constraints and tolerance analysis in an embodiment of the invention. The assembly includes 2 parts, part 1 405 and part 2 410. Part 1 405 includes three 3D objects and a circle in a 2D plane at a distance form the 3D objects. The circle may represent, for example, a surface of an object, or it may represent a clearance within an object. Because the circle of part 1 405 may be sufficient for computing tolerance and modification of the parts (if necessary), part 1 405 can represent a more complex part (e.g., real-world object) through simplified geometry rather than a detailed geometric model. In other words, part 1 405 can provide a simplified model in a 3D space by including at least the geometric and functional properties that are critical for the purposes of analysis. Part 2 410 includes a circle in a 2D plane and three points within the 3D space outside of the 2D plane. As with part 1 405, the components of part 2 410 can represent a more complex part (e.g., real-world object) through simplified geometry by including at least the critical geometric and functional properties. For example, the circle of part 2 410 may represent the cross-section of a cylinder as it intersects a respective plane, and the circle of part 1 405 may represent a clearance in a surface through which the cylinder is to be positioned. Further to this example, by assembling part 1 405 and part 2 410, it can be determined whether the cylinder represented in part 2 410 is of an acceptable size and position to fit within the clearance represented by the circle of part 1 405. Further, by performing a tolerance analysis on the assembly, as described below with reference to FIG. 4F, the tolerance of each component of the parts 405, 410 required to obtain an acceptable fit can be determined.

Figure 4A:
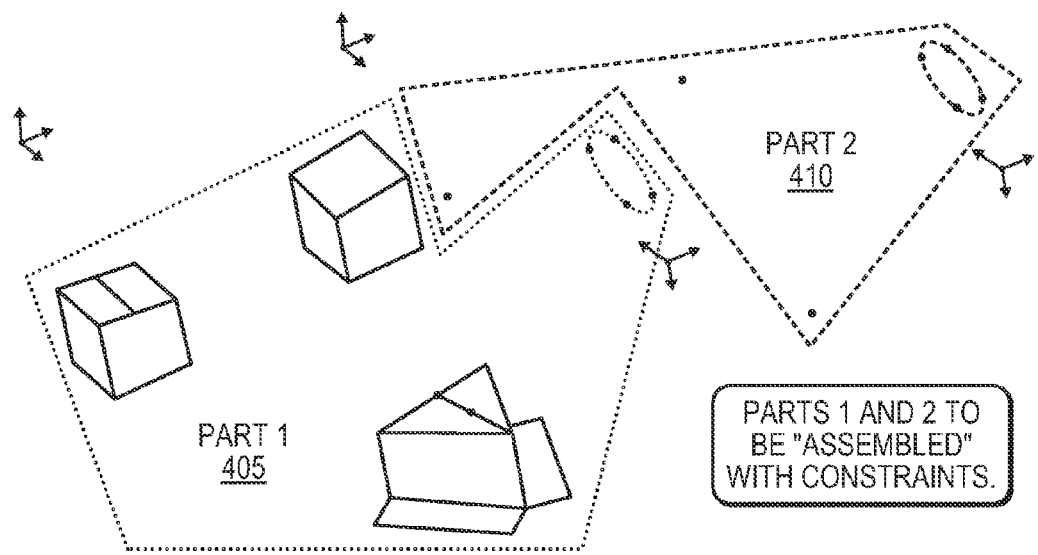
FIGS. 4A-F illustrate an assembly as it undergoes the application of constraints and tolerance analysis in an embodiment of the invention.
Figure 4B:
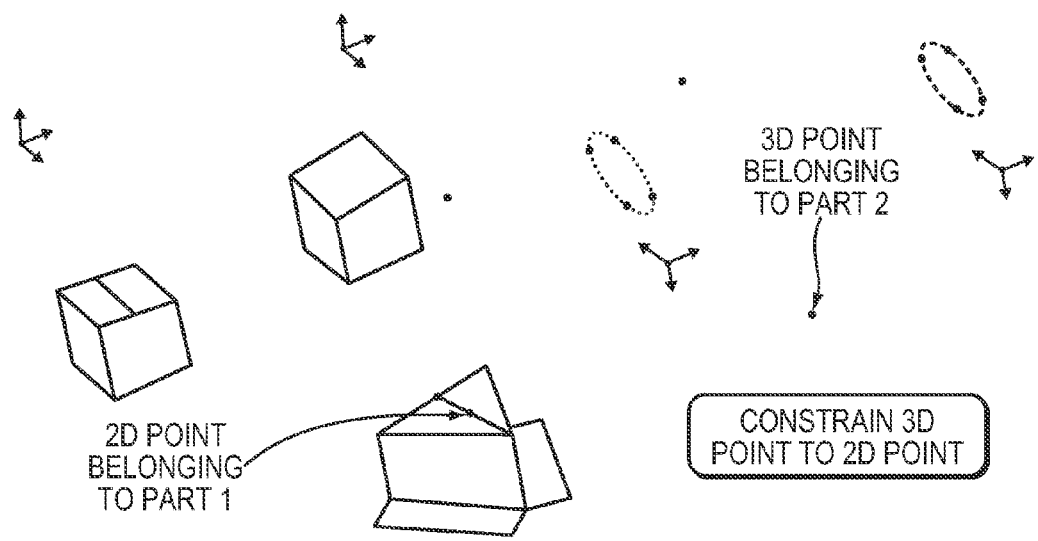
Figure 4C:
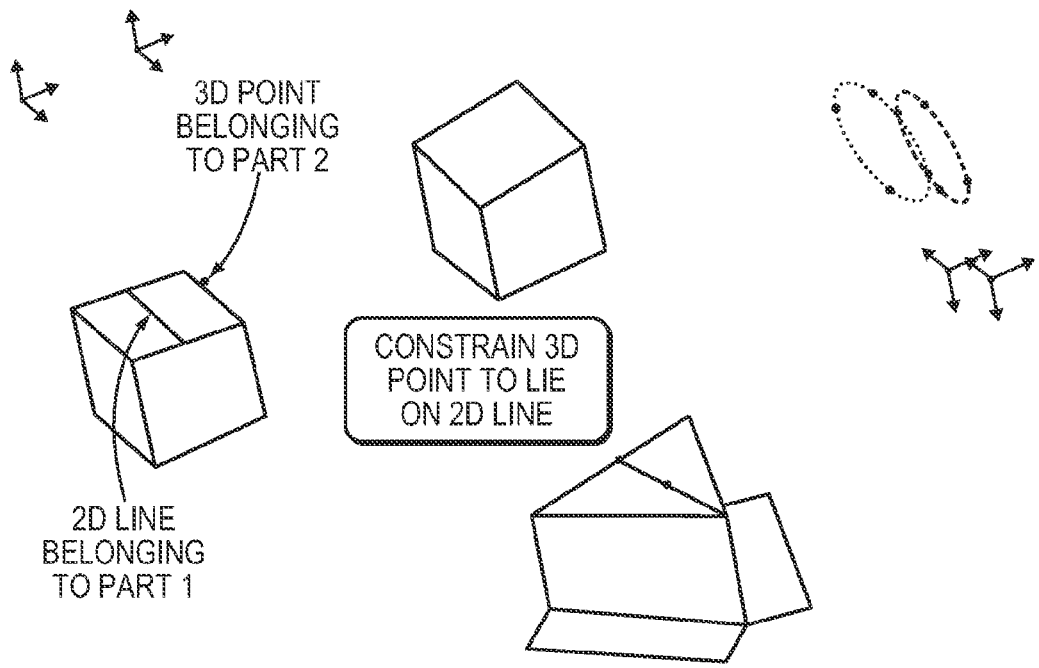

In FIG. 4B, a first constraint is applied, wherein a (highlighted) 3D point belonging to part 2 410 is selected to be constrained to a (highlighted) point located at the upper surface of a 3D object of part 1 405. In FIG. 4C these two points are shown to be constrained by a constraint joining the points to the same position in the 3D space. (In alternative embodiments, the points may be constrained by a constraint that limits the relative position of each point in a different manner, such as the distance or angle between the points.) As a result, a 3D point of part 2 410 is constrained to a 2D point of part 1 405.

Figure 4D:
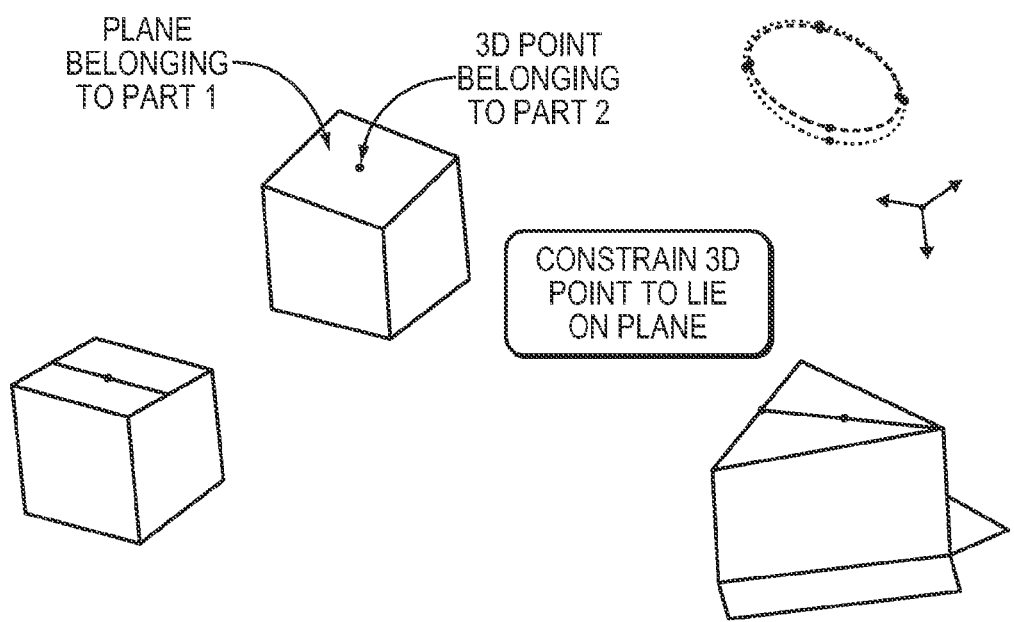

FIG. 4C further shows the application of a second constraint, wherein a (highlighted) point belonging to part 2 410 that is selected to be constrained to a (highlighted) 2D line residing on a surface of a 3D object belonging to part 1 405. In FIG. 4D the line and point are shown to be constrained by a constraint requiring the point to lie on the 2D line.

FIG. 4D further shows the application of a third constraint, wherein a (highlighted) point belonging to part 2 410 that is selected to be constrained to a (highlighted) 2D plane making up the surface of a 3D object belonging to part 1 405. As a result, the surface and point are constrained by a constraint requiring the point to within the 2D plane.

Figure 4E:
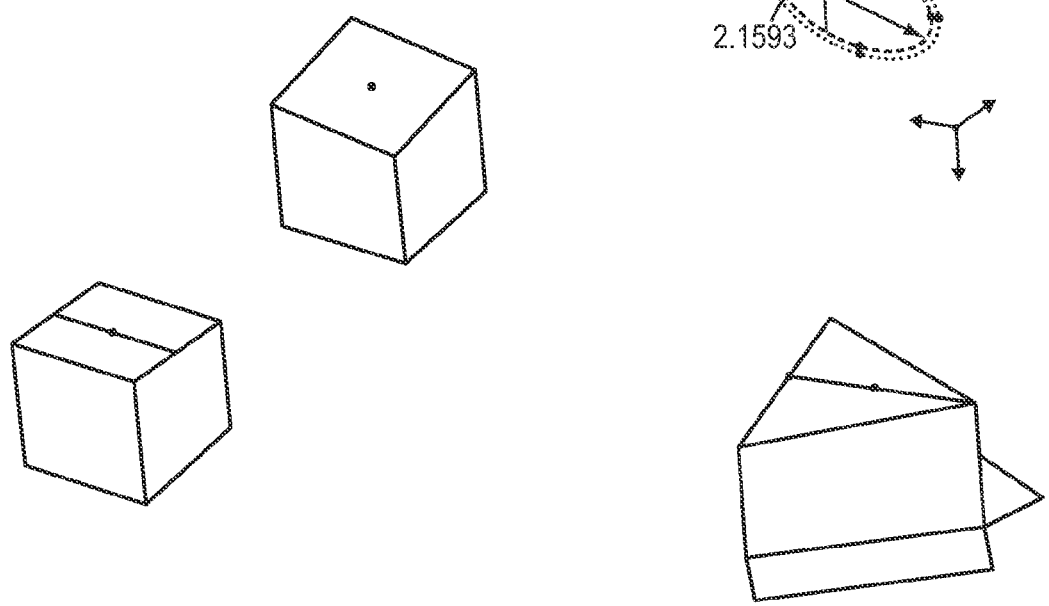

FIG. 4E shows the assembly of parts 1 and 2 405, 410 following the application of the three constraints described above. For the purposes of analysis, a measurement dimension is added between two points belonging to the circles of parts 1 and 2, respectively.

Figure 4F:
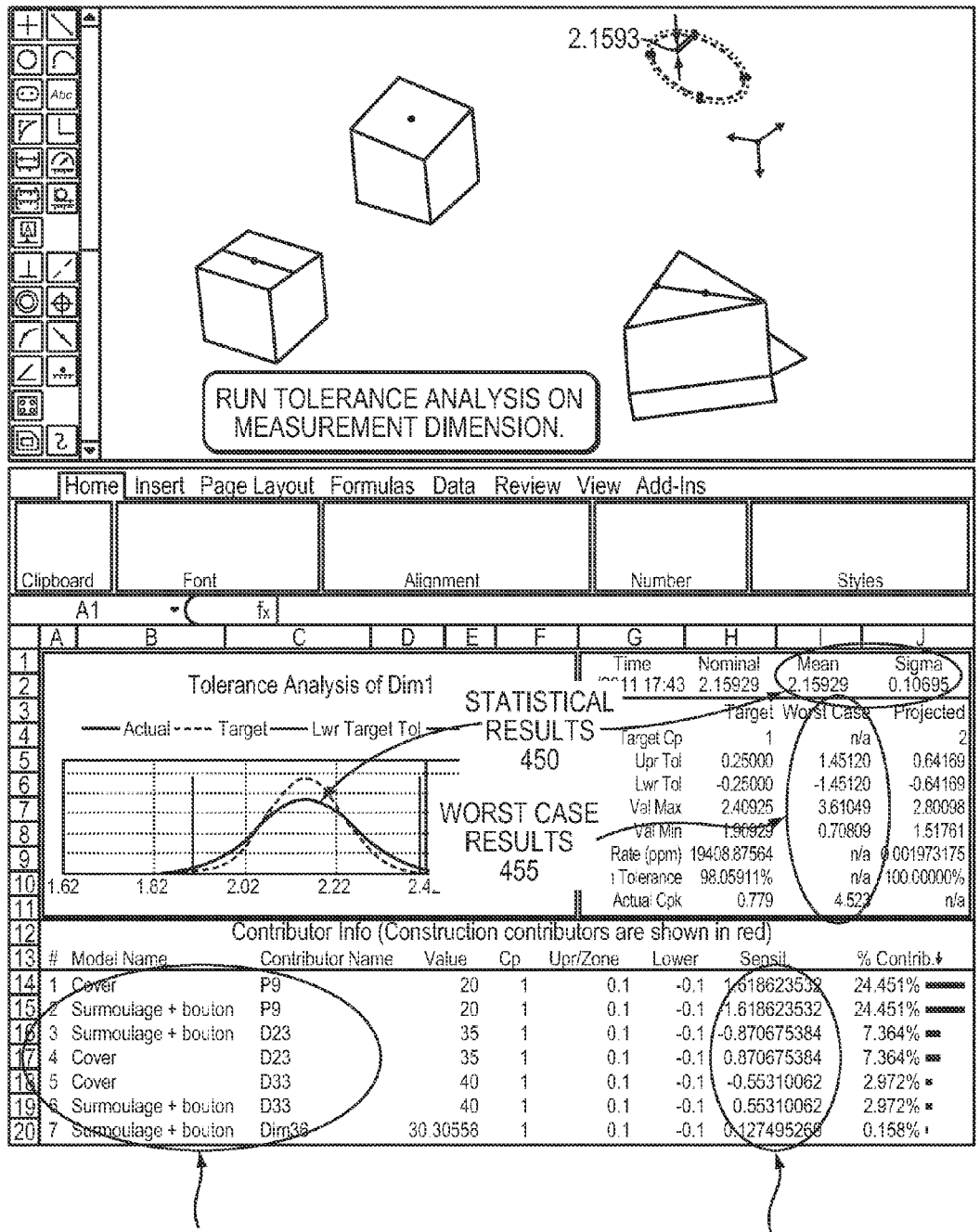

FIG. 4F shows the assembly of parts 1 and 2 405, 410, fully constrained, as well as a screen capture of a software tool performing tolerance analysis on the assembly. Through tolerance analysis, embodiments of the invention compute the possible range of values of dependent parameters that are a function of independent parameters (contributors) 460 that each have a range of possible values. The value range for each contributor is specified by tolerance limits. The value range of the analyzed parameters (dependent parameters) are computed as worst case limits or statistical ranges 450 resulting from the variation of the contributors within their tolerance limits.

Because contributor tolerance limits are generally small, it is common practice to estimate the impact of each contributor using a linear projection. The worst case impact 455 is estimated by multiplying the tolerance value by the contributor sensitivity 465. A variety of methods are used for estimating statistical variation. All linear estimation methods use contributor sensitivity values to estimate the statistical variation. Once the contributors have been identified and their sensitivities computed, the tolerance analysis may be computed.

Contributor sensitivity is the partial derivative of the contributor with respect to the analyzed parameter. It is the rate at which variation of the contributor will affect variation of the analyzed parameter. For example, in the equation y=3x, where x is the contributor and y is the analyzed parameter, the sensitivity of x is 3. If x changes by 0.1, it will result in a change in y of 0.3.

A constraint server (ECS) in embodiments of the invention may use a modified Newton-Raphson method as one of the solving methods. A person skilled in the art will recognize that the Newton Raphson method requires the computation of partial derivatives, and that a solver capable of computing partial derivatives for variational 2D-3D models is capable of computing the sensitivities of contributors to tolerance analysis.

The ECS may further use graph theory methods to optimize solving performance. A person skilled in the art will recognize that the graph methods enable automatic identification of contributors to a dependent parameter, and that a solver using graph methods for managing dependencies in a variational 2D-3D model is capable of automatic identification of contributors to tolerance analysis.

Figure 5:
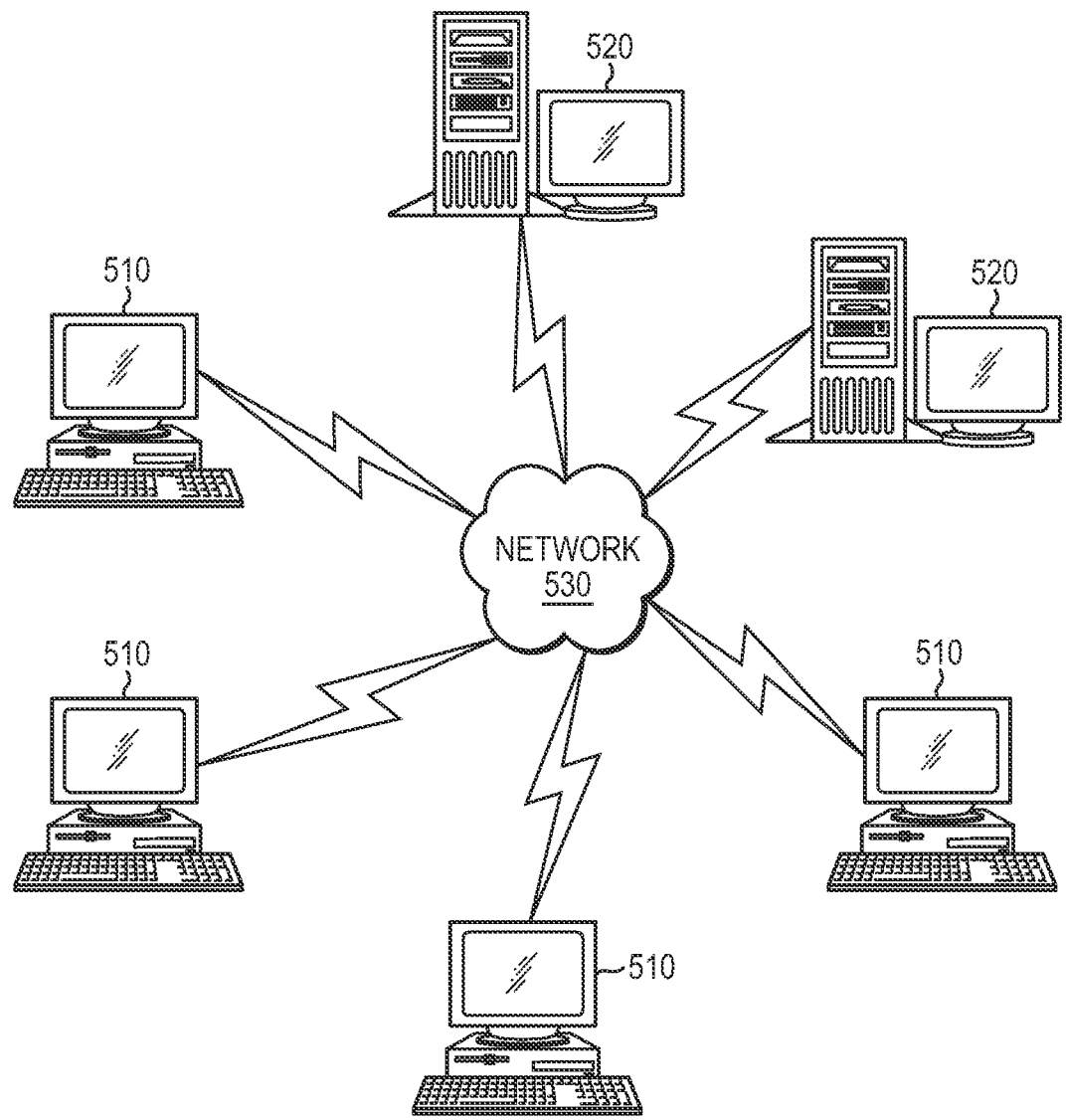
FIG. 5 is a schematic view of a computer network in which embodiments of the present invention may be implemented.

FIG. 5 is a schematic view of a computer network in which embodiments of the present invention may operate. Client devices 510 and server devices 520 provide processing, storage, and input/output devices executing application programs and the like. Client devices 510 can also be linked through a communications network 530 to other computing devices, including other client devices 510 and server devices 520. The communications network 530 may be part of a remote access network, a global network (e.g., the Internet), a worldwide collection of computing devices, local area or wide area networks, and gateways that currently use respective protocols (TCP/IP, Bluetooth, etc.) to communicate with one another. Other electronic device/computer network architectures are also suitable.

Figure 6:
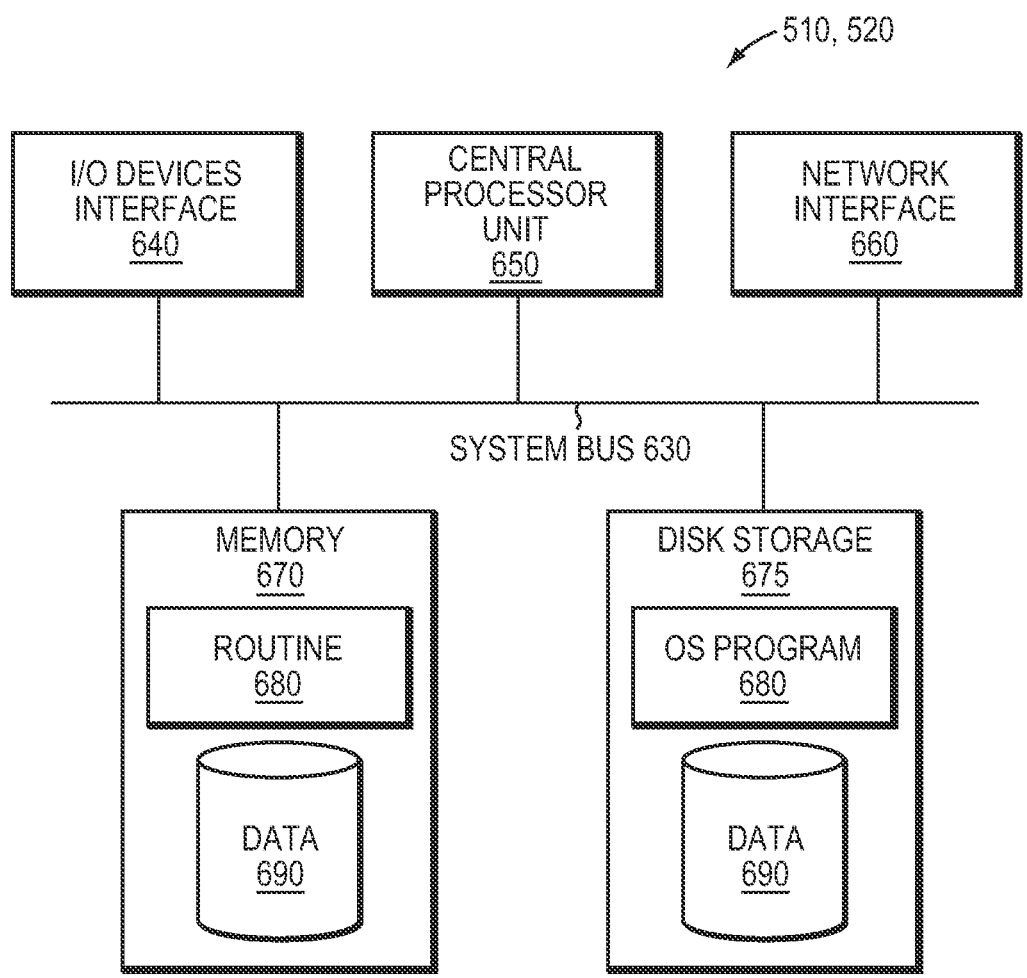
FIG. 6 is a block diagram of a computer system in which embodiments of the present invention may be implemented.

FIG. 6 is a block diagram of a computer node/device 510, 520 in the network of FIG. 5. Each device 510, 520 contains a system bus 630, where a bus is a set of hardware lines used for data transfer among the components of a device or processing system. The bus 630 is essentially a shared conduit that connects different elements of a device (e.g., processor, disk storage, memory, input/output ports, network ports, etc.) that enables the transfer of information between the elements. Attached to the system bus 630 is an I/O device interface 640 for connecting various input and output devices (e.g., keyboard, mouse, displays, printers, speakers, etc.) to the device 510, 520. A network interface 660 allows the device to connect to various other devices attached to a network (e.g., network 530 of FIG. 5). Memory 670 provides volatile storage for computer software instructions 680 and data 690 used to implement an embodiment of the present invention (e.g., user interface 405, logic 410, and database 415 of FIG. 4, and supporting code for performing the functions and processes 200, 301, 302, and 303 detailed above in FIGS. 2-3C). Disk storage 675 provides non-volatile storage for computer software instructions 680 and data 690 used to implement the methods and systems disclosed herein. Central processor unit 650 is also attached to the system bus 630 and provides for the execution of computer instructions.

In one embodiment, the processor routines 680 and data 690 are a computer program product (generally referenced 680), including a computer readable medium (e.g., a removable storage medium such as one or more DVD-ROM's, CD-ROM's, diskettes, tapes, or a portal server medium, etc.) that provides at least a portion of the software instructions for the invention system. The computer program product 680 can be installed by any suitable software installation procedure, as is well known in the art. In another embodiment, at least a portion of the software instructions may also be downloaded over a cable, communication and/or wireless connection.

It should be understood that the diagrams of FIGS. 1, 3A-O and 4A-F, Tables 1 and 2, and the flow diagrams of FIGS. 2A and 2B are examples that can include more or fewer components, be partitioned into subunits, or be implemented in different combinations. Moreover, the flow diagrams and components of the block diagrams may be implemented in hardware, firmware, or software. If implemented in software, the software may be written in any software language suitable for use in computer systems and networks as illustrated in FIGS. 5 and 6. The software may be embodied on any form of computer readable medium, such as RAM, ROM, or magnetic or optical disk, and loaded and executed by generic or custom processor(s).

While this invention has been particularly shown and described with references to example embodiments thereof, it will be understood by those skilled in the art that various changes in form and details may be made therein without departing from the scope of the invention encompassed by the appended claims.

What is claimed is:

1. In a computer aided design system, a computer-implemented method comprising:
   providing a 2D object within a 3D space, the 2D object having a set of geometric and functional properties;
   providing a 3D object within the 3D space, the 3D object having a set of geometric and functional properties;
   applying at least one constraint between the 2D object and the 3D object, the at least one constraint defining a relationship between the 2D object and the 3D object and including at least one mathematical equation having values corresponding to at least one of the geometric and functional properties of the 2D object and at least one of the geometric and functional properties of the 3D object;
   calculating modification to at least one of the 2D and 3D objects, based on a system of interdependent equations, to satisfy criteria regarding 1) the set of geometric and functional properties of the 2D object, 2) the set of geometric and functional properties of the 3D object and 3) the at least one constraint; and
   updating at least one of the 2D and 3D objects based on the calculated modification.

2. The computer-implemented method of claim 1, wherein the at least one constraint includes a constraint relating an element of the 2D object and an element of the 3D object by a fixed value.

3. The computer-implemented method of claim 1, wherein the at least one constraint includes an equation relating a property of the 2D object and a property of the 3D object.

4. The computer-implemented method of claim 1, wherein the 2D object includes a force, the force being applied to the 3D object via the at least one constraint.

5. The computer-implemented method of claim 1, wherein calculating the modification includes variationally solving the system of interdependent equations, the system including values corresponding to 1) the set of geometric and functional properties of the 2D object, and 2) the set of geometric and functional properties of the 3D object, the system of interdependent equations including the at least one mathematical equation.

6. The apparatus of claim 1, wherein calculating the modification includes calculating modification to satisfy criteria regarding a user-entered constraint.

7. The computer-implemented method of claim 1, wherein the set of geometric and functional properties of the 3D object include at least one property having a partial derivative of a computed parameter with respect to a contributor.

8. The computer-implemented method of claim 1, further comprising:
   identifying contributors to parameters computed with respect to the 2D object and the 3D object; and
   computing partial derivatives of the parameters with respect to the contributors.

9. The computer-implemented method of claim 8, further comprising calculating a range of possible values of the computed parameter based on the range of possible values for the contributors to the computed parameter.

10. The computer-implemented method of claim 1, wherein the at least one constraint includes a tolerance.

11. The computer-implemented method of claim 1, wherein the 3D object is a product of the 2D object, the 3D object created by sweeping the 2D object into the 3D space.

12. In a computer aided design system, a computer-implemented method comprising:
   providing a 2D plane within a 3D space;
   providing a 3D object within the 3D space, the 3D object having a set of geometric and functional properties;
   applying the at least one variational constraint between the 2D plane and the 3D object, the at least one variational constraint defining a relationship between the 2D object and the 3D object and including at least one mathematical equation having values corresponding to at least one geometric and functional property of the 2D plane and at least one of the geometric and functional properties of the 3D object;
   calculating modification to the 3D object, based on a system of interdependent equations, to satisfy criteria regarding 1) the set of geometric and functional properties of the 3D object and 2) the at least one variational constraint; and
   updating the 3D object based on the calculated modification.

13. In a computer aided design system, a computer-implemented method comprising:
   providing a first 2D object within a first plane in a 3D space, the 2D object having a set of geometric and functional properties;
   providing a second 2D object within a second plane in the 3D space, the second 2D object having a set of geometric and functional properties, the second plane being distinct from the first plane;
   applying at least one constraint between the first and second 2D objects, the at least one constraint defining a relationship between the 2D object and the 3D object and including at least one mathematical equation having values corresponding to at least one of the geometric and functional properties of the first 2D object and at least one of the geometric and functional properties of the second 2D object;

calculating modification to at least one of the first and second 2D objects to satisfy criteria regarding 1) the set of geometric and functional properties of the first 2D object, 2) the set of geometric and functional properties of the second 2D object and 3) the at least one constraint; and updating at least one of the first and second 2D objects based on the calculated modification.

14. The computer-implemented method of claim 13, further comprising updating at least one of the first and second planes based on the calculated modification.

15. In a computer aided design system, a computer-implemented method comprising:

providing a first model within a 3D space, the first model including a 2D object within a 2D plane and at least one object external to the 2D plane, the first model having a set of geometric and functional properties;

providing a second model within a 3D space, the second model including a 2D object within a 2D plane and at least one object external to the 2D plane, the second model having a set of geometric and functional properties;

applying at least one constraint between the first and second models, the at least one constraint defining a relationship between the 2D object and the 3D object and including at least one mathematical equation having values corresponding to at least one of the geometric and functional properties of the first model and the set of geometric and functional properties of the second model;

calculating modification to at least one of the first and second models, based on a system of interdependent equations, to satisfy criteria regarding 1) the set of geometric and functional properties of the first model, 2) the set of geometric and functional properties of the second model and 3) the at least one constraint; and updating at least one of the first and second models based on the calculated modification.

* * * * *